United States Patent
Takeshige

(10) Patent No.: US 10,528,384 B2
(45) Date of Patent: Jan. 7, 2020

(54) INFORMATION PROCESSING APPARATUS, MULTITHREAD MATRIX OPERATION METHOD, AND MULTITHREAD MATRIX OPERATION PROGRAM

(71) Applicant: FUJITSU LIMITED, Kawasaki-shi, Kanagawa (JP)

(72) Inventor: Kazuaki Takeshige, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 12 days.

(21) Appl. No.: 15/978,761

(22) Filed: May 14, 2018

(65) Prior Publication Data

US 2018/0341517 A1 Nov. 29, 2018

(30) Foreign Application Priority Data

May 23, 2017 (JP) .................................. 2017-101556

(51) Int. Cl.
*G06F 9/46* (2006.01)
*G06F 9/48* (2006.01)
(Continued)

(52) U.S. Cl.
CPC .............. *G06F 9/48* (2013.01); *G06F 9/5027* (2013.01); *G06F 17/16* (2013.01)

(58) Field of Classification Search
None
See application file for complete search history.

(56) References Cited

U.S. PATENT DOCUMENTS 6,675,187 B1 * 1/2004 Greenberger ............. G06F 1/02
708/622
7,337,205 B2 * 2/2008 Sazegari ................. G06F 17/16
708/607
(Continued)

FOREIGN PATENT DOCUMENTS

JP 6-75988 3/1994
JP 2009-245381 10/2009

OTHER PUBLICATIONS

Hyuk-Jae Lee et al.; "Generalized Cannon's Algorithm for Parallel Matrix Multiplication", Copyright 1997 ACM 0-89791-902-5; (Lee_1997.pdf; pp. 44-51) (Year: 1997).*

(Continued)

*Primary Examiner* — Hiren P Patel
(74) *Attorney, Agent, or Firm* — Staas & Halsey LLP

(57) ABSTRACT

An information processing apparatus includes a memory; and a processor. The processor is configured to execute partitioning a predetermined matrix whose values of elements are to be generated by a matrix operation, into a predetermined number of first submatrices whose dimension in at least one of a row direction and a column direction is a multiple of a block size corresponding to a number of registers used for the matrix operation, and into the predetermined number of second submatrices that are different from the predetermined number of the first submatrices; and assigning a matrix operation to generate values of elements of each of the predetermined number of the first submatrices, and a matrix operation to generate values of elements of each of the predetermined number of the second submatrices, to each of the predetermined number of threads.

7 Claims, 12 Drawing Sheets

(51) Int. Cl.
*G06F 9/50* (2006.01)
*G06F 17/16* (2006.01)

(56) References Cited

U.S. PATENT DOCUMENTS

| | | | | |
|---|---|---|---|---|
| 8,316,072 B2* | 11/2012 | Gustavson | ............... | G06F 17/16 708/520 |
| 8,527,569 B2* | 9/2013 | Nakanishi | ............... | G06F 17/16 708/446 |
| 9,069,716 B2* | 6/2015 | Ge | ............... | G06F 7/52 |
| 9,135,214 B2* | 9/2015 | Bell | ............... | G06F 17/16 |
| 9,217,313 B2* | 12/2015 | Shetty | ............... | E21B 41/00 |
| 9,489,176 B2* | 11/2016 | Haugen | ............... | G06F 17/16 |
| 9,645,973 B2* | 5/2017 | Ono | ............... | G06F 15/0225 |
| 9,886,418 B2* | 2/2018 | Yang | ............... | G06F 17/16 |
| 10,013,393 B2* | 7/2018 | Takeshige | ............... | G06F 17/16 |
| 10,067,910 B2* | 9/2018 | Zhou | ............... | G06F 17/16 |
| 10,241,971 B2* | 3/2019 | Muralimanohar | ......... | G06F 7/523 |
| 2003/0126176 A1* | 7/2003 | Devir | ............... | G06F 17/16 708/520 |
| 2005/0071409 A1* | 3/2005 | Gustavson | ............... | G06F 12/0875 708/514 |
| 2005/0193050 A1* | 9/2005 | Sazegari | ............... | G06F 17/16 708/607 |
| 2009/0235049 A1* | 9/2009 | Li | ............... | G06F 17/16 712/30 |
| 2010/0082724 A1* | 4/2010 | Diyankov | ............... | G06F 17/16 708/520 |
| 2013/0139038 A1* | 5/2013 | Yosoku | ............... | H03M 13/1137 714/780 |
| 2014/0108481 A1* | 4/2014 | Davis | ............... | G06F 17/16 708/607 |
| 2014/0201450 A1* | 7/2014 | Haugen | ............... | G06F 17/16 711/125 |
| 2014/0298351 A1* | 10/2014 | Usui | ............... | G06F 17/16 718/107 |
| 2015/0066463 A1* | 3/2015 | Shetty | ............... | E21B 41/00 703/10 |
| 2015/0120758 A1* | 4/2015 | Cichosz | ............... | G06F 16/25 707/748 |
| 2017/0060811 A1* | 3/2017 | Yang | ............... | G06F 17/16 |
| 2017/0344514 A1* | 11/2017 | Zhou | ............... | G06F 17/16 |
| 2018/0004709 A1* | 1/2018 | Zhou | ............... | G06F 8/443 |
| 2018/0260690 A1* | 9/2018 | Young | ............... | G06F 7/78 |
| 2018/0321938 A1* | 11/2018 | Boswell | ............... | G06F 9/30014 |
| 2018/0373902 A1* | 12/2018 | Muralimanohar | ......... | G11C 11/15 |
| 2019/0026078 A1* | 1/2019 | Bannon | ............... | G06F 7/575 |

OTHER PUBLICATIONS

Quintana-Orti et al.; "Programming Matrix Algorithms-by-Blocks for Thread-Level Parallelism", ACM Jul. 2009, (Quintana_2009.pdf; pp. 1-26) (Year: 2009).*

Xing Liu et al.; "Efficient Sparse Matrix-Vector Multiplication on x86-Based Many-Core Processors", ACM 2013, (Liu_2013.pdf; pp. 1-10) (Year: 2013).*

Japanese Patent Office English Abstract for Japanese Patent Publication No. 6-75988, published Mar. 18, 1994.

Japanese Patent Office English Abstract for Japanese Patent Publication No. 2009-245381, published Oct. 22, 2009.

Whaley et al., "Automated Empirical Optimization of Software and the ATLAS Project" Jan. 22, 2007, pp. 1-32 and bibliographic pages.

* cited by examiner

INFORMATION PROCESSING APPARATUS, MULTITHREAD MATRIX OPERATION METHOD, AND MULTITHREAD MATRIX OPERATION PROGRAM

CROSS-REFERENCE TO RELATED APPLICATIONS

This application is based upon and claims the benefit of priority of the prior Japanese Priority Application No. 2017-101556 filed on May 23, 2017, the entire contents of which are hereby incorporated by reference.

FIELD

The present disclosure relates to an information processing apparatus, a multithread matrix operation method, and a multithread matrix operation program.

BACKGROUND

Conventionally, there has been a technology that executes a matrix operation to generate values of the elements of a predetermined matrix in parallel by multiple threads. For example, to perform a matrix operation to generate values of the elements of a matrix, multiple matrix operations equivalent to the single matrix operation may be executed in parallel by multiple threads to generate values of the elements of multiple submatrices of the matrix partitioned to have nearly the same dimension in the row direction or in the column direction.

As prior art, for example, there has been a technology of multiplication of matrices that multiplies in parallel partial row vectors obtained by partitioning the rows of one matrix, by partial column vectors obtained by partitioning columns of the other matrix, and adds the multiplication results to output the result by partial sum-of-product operations. Also, for example, there has been a technology of LU decomposition that adjusts the number of block stages based on the size of an LU decomposition so as to execute remaining LU decompositions at a high speed by vector operations.

[Related-Art Documents]

PATENT DOCUMENTS

[Patent Document 1] Japanese Laid-Open Patent Publication No. 2009-245381
[Patent Document 2] Japanese Laid-Open Patent Application No. 6-75988

However, with the conventional technologies, the time required for executing matrix operations by threads may increase. For example, if one of the multiple matrix operations has a lower execution efficiency than the others, the time required for all multiple matrix operations executed by the multiple threads would increase.

SUMMARY

According to an embodiment, an information processing apparatus includes a memory; and a processor. The processor is configured to execute partitioning a predetermined matrix whose values of elements are to be generated by a matrix operation, into a predetermined number of first submatrices whose dimension in at least one of a row direction and a column direction is a multiple of a block size corresponding to a number of registers used for the matrix operation, and into the predetermined number of second submatrices that are different from the predetermined number of the first submatrices; and assigning a matrix operation to generate values of elements of each of the predetermined number of the first submatrices, and a matrix operation to generate values of elements of each of the predetermined number of the second submatrices, to each of the predetermined number of threads.

According to one aspect in the present disclosure, an effect is brought such that it is possible to reduce the time required for matrix operations.

The object and advantages in the embodiment will be realized and attained by means of the elements and combinations particularly pointed out in the claims. It is to be understood that both the foregoing general description and the following detailed description are exemplary and explanatory and are not restrictive of the invention as claimed.

DESCRIPTION OF EMBODIMENTS

In the following, an information processing apparatus, a multithread matrix operation method, and a multithread matrix operation program will be described in detail according to embodiments with reference to the drawings.

(One Application Example of Multithread Matrix Operation Method According to Embodiment)

Figure 1:
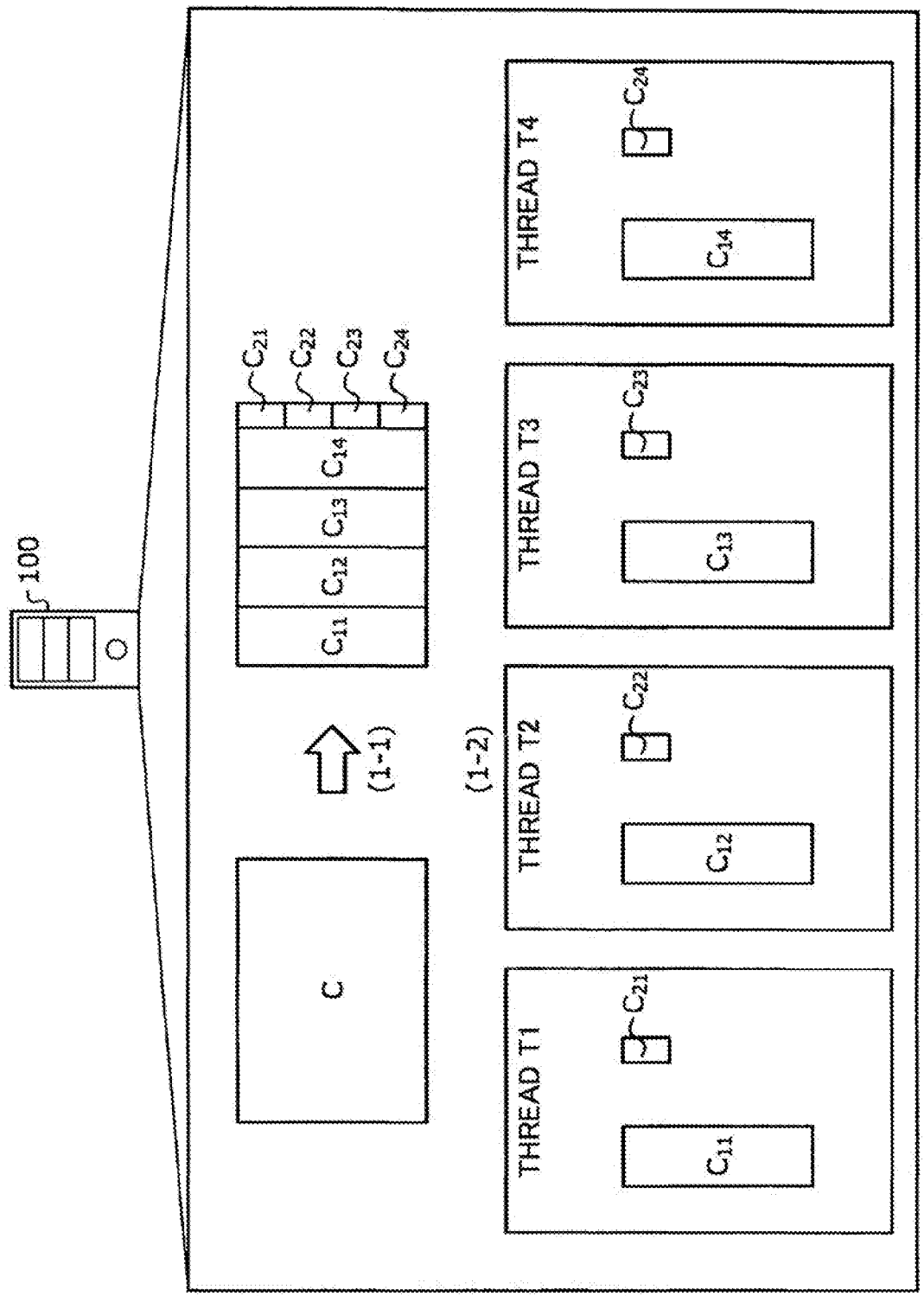
FIG. 1 is an explanatory diagram illustrating one application example of a multithread matrix operation method according to an embodiment.

FIG. 1 is an explanatory diagram illustrating one application example of the multithread matrix operation method according to an embodiment. An information processing apparatus 100 is a computer to execute a predetermined number of matrix operations in parallel by a predetermined number of threads. The information processing apparatus 100 is, for example, a server, a PC (Personal Computer), a note PC, a tablet terminal, a smart phone, or a wearable terminal.

Here, in numerical computation, matrix operations are executed quite often. For example, matrix operations are executed in block LU decomposition for solving simultaneous linear equations represented by a dense matrix. Since a dense matrix is a matrix that has a comparatively large number of non-zero elements, the time required for numerical computation tends to be considerably long. Thereupon, in order to reduce the time required for the numerical computation, it has been desired to reduce the time required for matrix operations in the numerical computation.

For example, one may consider implementing a matrix operation to generate values of the elements of a predetermined matrix efficiently by using multiple threads. Specifically, to perform a matrix operation to generate values of the elements of a matrix C by an inner product operation of a matrix A and a matrix B, multiple matrix operations equivalent to the single matrix operation may be executed in parallel by multiple threads to generate values of the elements of submatrices that correspond to multiple submatrices of the matrix C partitioned to have nearly the same dimension in the row direction or in the column direction. Here, the matrix A is a matrix of M-by-K, the matrix B is a matrix of K-by-N, and the matrix C is a matrix of M-by-N. Here, "a-by-b" means the matrix has "a" rows and "b" columns.

Also, among processes to implement a matrix operation, comparing a load process of reading data to be used for the matrix operation from a memory, with an operation process of executing calculation, the time required for the load process tends to be longer. Therefore, it is favorable to manipulate matrices A and B used in a matrix operation by units of blocks having a predetermined size so as to utilize data read from a memory and held in a cache or registers for multiple operation processes. The predetermined block size in the row direction may be different from the predetermined block size in the column direction.

Thereupon, in order to increase the efficiency of matrix operations executed by the multiple threads, there are cases where a cache blocking technique and a register blocking technique are applied to the multiple threads. Such a cache blocking technique and a register blocking technique are techniques for manipulating a matrix A and a matrix B used in matrix operations by the units of blocks having a predetermined size. The following reference 1 may be referred to for cache blocking techniques and register blocking techniques.

Reference 1: R. Clint Whaley, Antoine Petitet, and Jack J. Dongarra, "Automated empirical optimizations of software and the ATLAS project", Jan. 22, 2007, pp. 1-32

However, even in the case of using such techniques, one of the matrix operations may have a lower execution efficiency to become a bottleneck, and thereby, the time required for all of the multiple matrix operations executed in parallel by the multiple threads may increase. For example, if the dimension of a partitioned submatrix of a matrix C in the row direction or in the column direction cannot be divided evenly by a predetermined unit block size of a register blocking, the execution efficiency of a matrix operation to generate the elements of the submatrix becomes lower.

Thereupon, in the embodiment in the present disclosure, a multithread matrix operation method will be described in which the time required for matrix operations assigned to a predetermined number of threads is equalized to eliminate the bottleneck so as to reduce the time required for all of the predetermined number of matrix operations.

In FIG. 1, the information processing apparatus 100 generates a predetermined number of threads. The information processing apparatus 100 generates, for example, four threads T1 to T4. The thread is an execution unit of a program. Each of the threads executes an assigned matrix operation.

(1-1) The information processing apparatus 100 partitions a predetermined matrix into the predetermined number of first submatrices and into the predetermined number of second submatrices that are different from the predetermined number of the first submatrices. The predetermined matrix is a matrix whose values of the elements are generated by a matrix operation. The predetermined matrix is obtained, for example, by an inner product operation. In the example in FIG. 1, the predetermined matrix corresponds to a matrix C that is to be obtained by an inner product operation of a matrix A and a matrix B.

The first submatrix is a submatrix whose dimension in at least one of the row direction and the column direction is a multiple of a block size corresponding to the number of registers used for a matrix operation. The block size corresponding to the number of registers is a predetermined block size in the case of using a register blocking technique to manipulate a matrix in the predetermined block size. The predetermined number of first submatrices exist. The predetermined number of second submatrices exist.

The information processing apparatus 100 partitions the matrix C in the row direction into four first submatrices, for example, by the units of a multiple of the block size, to identify the four first submatrices $C_{11}$, $C_{12}$, $C_{13}$, and $C_{14}$, starting from the head in the row direction. Then, the information processing apparatus 100 partitions, for example, a region in the matrix C other than the four first submatrices $C_{11}$, $C_{12}$, and $C_{13}$ and $C_{14}$ into four submatrices to identify four second submatrices $C_{21}$, $C_{22}$, $C_{23}$, and $C_{24}$. Alternatively, the information processing apparatus 100 may first identify the four second submatrices $C_{21}$, $C_{22}$, $C_{23}$, and $C_{24}$, and then, identify the four first submatrices $C_{11}$, $C_{12}$, $C_{13}$, and $C_{14}$.

(1-2) The information processing apparatus 100 assigns a matrix operation to generate values of the elements of each of the predetermined number of first submatrices, and a matrix operation to generate values of the elements of each of the predetermined number of second submatrices, to each of the predetermined number of threads.

The information processing apparatus 100 assigns, for example, a matrix operation to generate values of the elements of the first submatrix $C_{11}$, and a matrix operation to generate values of the elements of the second submatrix $C_{21}$, to the thread T1. The information processing apparatus 100 assigns, for example, a matrix operation to generate values of the elements of the first submatrix $C_{12}$, and a matrix operation to generate values of the elements of the second submatrix $C_{22}$, to the thread T2. The information processing apparatus 100 assigns, for example, a matrix operation to generate values of the elements of the first submatrix $C_{13}$, and a matrix operation to generate values of the elements of the second submatrix $C_{23}$, to the thread T3. The information processing apparatus 100 assigns, for example, a matrix operation to generate values of the elements of the first submatrix $C_{14}$, and a matrix operation to generate values of the elements of the second submatrix $C_{24}$, to the thread T4.

Then, the information processing apparatus 100 causes the predetermined number of the threads to execute the multiple matrix operations that are equivalent to a matrix operation to generate values of the elements of the predetermined matrix, to be capable of generating values of the elements of the predetermined matrix. The information processing apparatus 100 attempts to equalize the time required for matrix operations assigned to the threads to prevent one of the matrix operations from becoming a bottleneck, so as to reduce the time required for all of the predetermined number of matrix operations.

For example, conventionally, in the case where a predetermined matrix is partitioned into submatrices having nearly the same dimension in the row direction, and an odd submatrix is obtained other than evenly partitioned submatrices, matrix operations that generate the elements of columns of the odd submatrix may be collectively assigned to one of the threads, and become a bottleneck. In contrast, the information processing apparatus 100 further partitions a region that is different from the first submatrices in the predetermined matrix, into second submatrices, and hence, the time required for matrix operations assigned to the threads is equalized, and the bottleneck can be eliminated.

Here, although the case has been described in which the information processing apparatus 100 uses, as the first submatrix, a submatrix whose dimension in at least one of the row direction and the column direction is a multiple of the block size, it is not limited as such. For example, if there is a tendency in the shape of the predetermined matrix such that the dimension in the row direction does not become a multiple of the block size, the information processing apparatus 100 may use, as the first submatrix, a submatrix whose dimension in the row direction is a multiple of the block size.

Also, for example, if there is a tendency in the shape of the predetermined matrix such that the dimension in the column direction does not become a multiple of the block size, the information processing apparatus 100 may use, as the first submatrix, a submatrix whose dimension in the column direction is a multiple of the block size. Also, for example, depending on the shape of the predetermined matrix, the information processing apparatus 100 may selectively use, as the first submatrix, a submatrix whose dimension in the row direction is a multiple of the block size, or a submatrix whose dimension in the column direction is a multiple of the block size.

Here, although the case has been described in which the information processing apparatus 100 partitions the predetermined matrix so that the second submatrices exist on the right-hand side of the first submatrices, it is not limited as such. For example, the information processing apparatus 100 may partition the predetermined matrix so that the first submatrices exist on the right-hand side of the second submatrices. Alternatively, the information processing apparatus 100 may partition the predetermined matrix so that the second submatrices exist on the upper or lower side of the first submatrices.

(Example of Hardware Configuration of Information Processing Apparatus 100)

Next, an example of a hardware configuration of the information processing apparatus 100 illustrated in FIG. 1 will be described by using FIG. 2.

Figure 2:
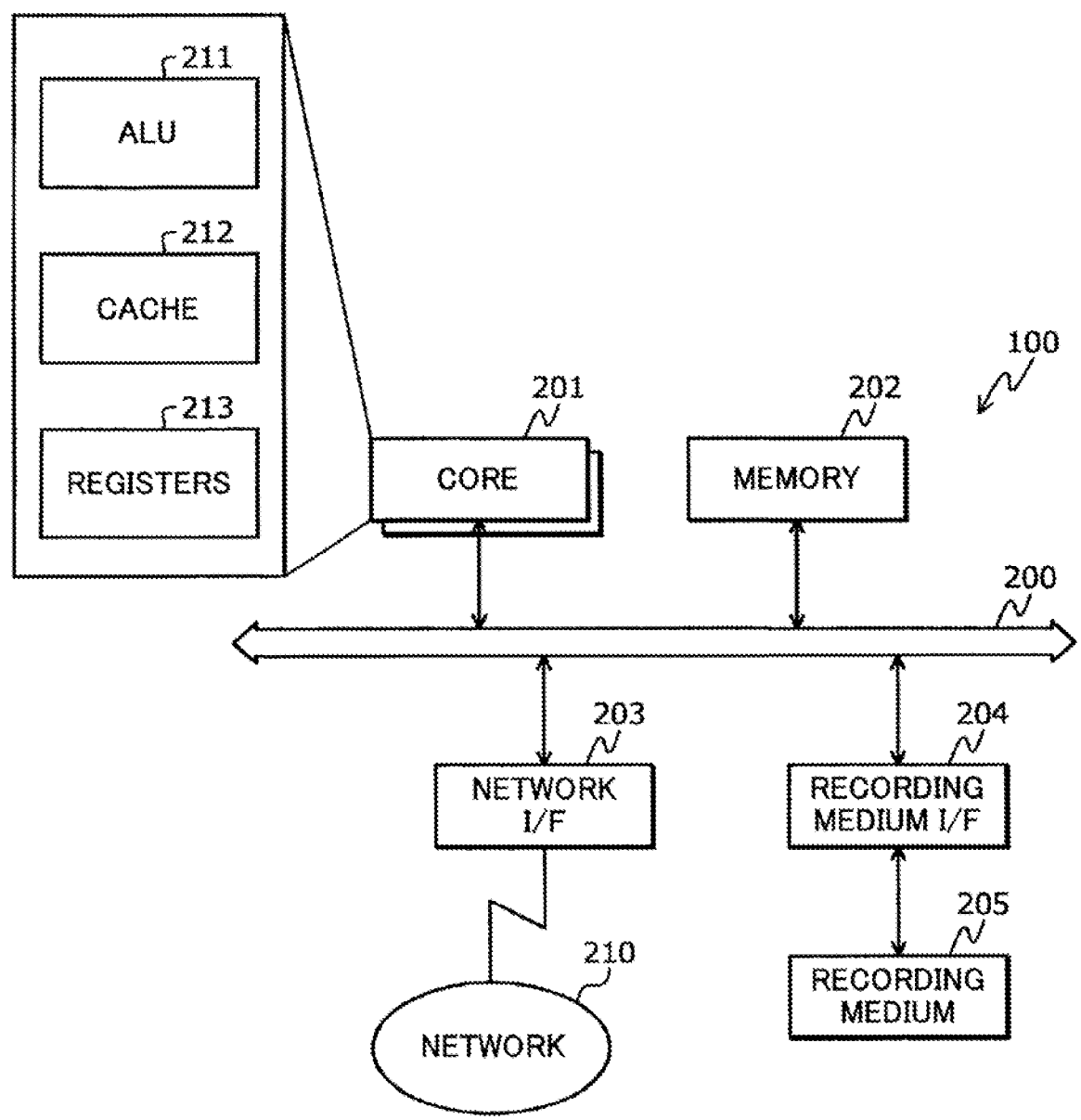
FIG. 2 is a block diagram illustrating an example of a hardware configuration of an information processing apparatus 100.

FIG. 2 is a block diagram illustrating an example of a hardware configuration of the information processing apparatus 100. In FIG. 2, the information processing apparatus 100 includes multiple cores 201, a memory 202, a network I/F (interface) 203, a recording medium I/F 204, and a recording medium 205. Also, the components are connected to each other by a bus 200.

Here, one of the cores 201 controls the entire information processing apparatus 100. Each of the cores 201 includes an arithmetic logic unit (ALU) 211, a cache 212, and registers 213. The ALU 211 executes predetermined processes. The ALU 211 executes, for example, a thread having a matrix operation assigned. The cache 212 temporarily stores data used by the ALU 211. The register 213 temporarily stores data read in the ALU 211.

The memory 202 includes, for example, a ROM (Read-Only Memory), a RAM (Random Access Memory), a flash ROM, and the like. Specifically, for example, a flash ROM and a ROM store various programs, and a RAM is used as a work area of the core 201. A program stored in the memory 202 is loaded into the core 201, to cause the core 201 to execute a process as coded.

The network I/F 203 is connected to a network 210 through a communication line, to be connected to other computers through the network 210. Also, the network I/F 203 functions as an interface between the network 210 and the inside, and controls input and output of data with the other computers. For example, a modem, a LAN adapter, or the like may be adopted as the network I/F 203.

The recording medium I/F 204 controls read and write of data on the recording medium 205 under control of the core 201. The recording medium I/F 204 is, for example, a disk drive, an SSD (Solid State Drive), a USB (Universal Serial Bus) port, or the like. The recording medium 205 is a non-volatile memory that stores data written under control of the recording medium I/F 204. The recording media 205 is, for example, a disk, a semiconductor memory, a USB memory, or the like. The recording medium 205 may be attachable and detachable on the information processing apparatus 100.

In addition to the components described above, the information processing apparatus 100 may include, for example, a keyboard, a mouse, a display, a printer, a microphone, and a speaker. Also, the information processing apparatus 100 does not necessarily need to include the recording medium I/F 204 and the recording medium 205.

(Example of Functional Configuration of Information Processing Apparatus 100)

Next, an example of a functional configuration of the information processing apparatus 100 will be described by using FIG. 3.

Figure 3:
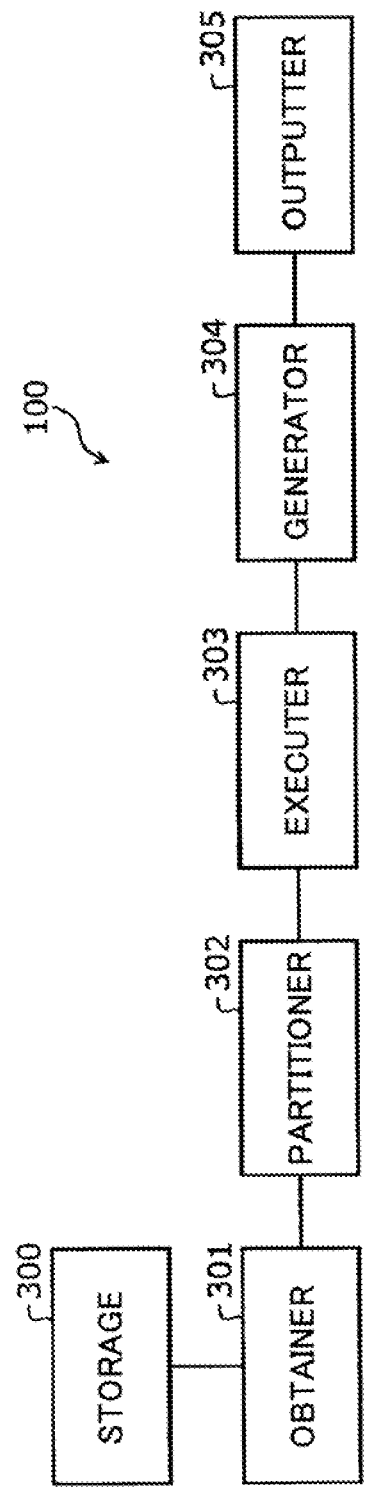
FIG. 3 is a block diagram illustrating an example of a functional configuration of the information processing apparatus 100.

FIG. 3 is a block diagram illustrating an example of a functional configuration of the information processing apparatus 100. As illustrated in FIG. 3, the information processing apparatus 100 includes a storage 300, an obtainer 301, a partitioner 302, an executer 303, a generator 304, and an outputter 305.

The storage 300 is implemented, for example, by a storage area such as the memory 202 and the recording medium 205 illustrated in FIG. 2. The obtainer 301 to the outputter 305 implements functions realized by a processor. Specifically, the obtainer 301 to the outputter 305 implement respective functions, for example, by causing the core 201 to run a program stored in the storage area such as the memory 202 and the recording medium 205 illustrated in FIG. 2, or by the network I/F 203. A processed result of each of the functional units is stored, for example, in the storage area such as the memory 202 and the recording medium 205 illustrated in FIG. 2.

The storage 300 stores one or more partitioning methods to be used by the partitioner 302 when partitioning a predetermined matrix. The predetermined matrix is a matrix whose values of elements are generated by a matrix operation. The predetermined matrix is generated, for example, by matrix operations using several matrices. Specifically, the predetermined matrix may be generated by an inner product operation of a first matrix and a second matrix. The storage 300 enables the partitioner 302 to refer to the one or more partitioning methods, and enables the partitioner 302 to selectively use one of the partitioning methods.

The obtainer 301 obtains input matrices used for a matrix operation to generate values of the elements of a predetermined matrix. The obtainer 301 obtains, for example, a first matrix and a second matrix used for an inner product operation that generates values of the elements of the predetermined matrix. Thereby, the obtainer 301 enables the executer 303 to refer to the input matrices, and enables the executer 303 to generate values of the elements of the predetermined matrix.

The partitioner 302 partitions the predetermined matrix into the predetermined number of first submatrices and into the predetermined number of second submatrices that are different from the predetermined number of the first submatrices. The first submatrix is a submatrix whose dimension in at least one of the row direction and the column direction is a multiple of the block size corresponding to the number of registers used for a matrix operation. The block size is, for example, a predetermined block size in a register blocking technique. The predetermined number of first submatrices exist. The predetermined number of second submatrices exist.

The partitioner 302 partitions the predetermined matrix, for example, into the predetermined number of first submatrices whose dimension in the row direction is a multiple of the block size, and the predetermined number of second submatrices. Thereby, in the case where the dimension in the row direction of the predetermined matrix cannot be divided evenly by the block size, the partitioner 302 can reduce efficiently the time required for all matrix operations assigned to the predetermined number of threads.

The partitioner 302 partitions the predetermined matrix, for example, into the predetermined number of first submatrices whose dimension in the column direction is the multiple of the block size, and the predetermined number of second submatrices. Thereby, in the case where the dimension in the column direction of the predetermined matrix cannot be divided evenly by the block size, the partitioner 302 can reduce efficiently the time that would be required conventionally for all matrix operations assigned to the predetermined number of threads.

The partitioner 302 compares, for example, a first remainder obtained by dividing the dimension in the row direction of the predetermined matrix by the block size, with a second remainder obtained by dividing the dimension in the column direction of the predetermined matrix by the block size. Here, as a result of the comparison, if the first remainder is less than the second remainder, the partitioner 302 partitions the predetermined matrix into the predetermined number of first submatrices whose dimension in the row direction is a multiple of the block size, and the predetermined number of second submatrices.

On the other hand, as a result of the comparison, if the first remainder is greater than the second remainder, the partitioner 302 partitions the predetermined matrix into the predetermined number of first submatrices whose dimension in the column direction is a multiple of the block size, and the predetermined number of second submatrices. In this way, the partitioner 302 selectively uses the partitioning methods of partitioning the predetermined matrix, and can reduce efficiently the time required for all matrix operations assigned to the predetermined number of threads.

The executer 303 assigns a matrix operation to generate values of the elements of each of the predetermined number of first submatrices, and a matrix operation to generate values of the elements of each of the predetermined number of second submatrices, to each of the predetermined number of threads. For example, the executer 303 assigns a matrix operation to generate values of the elements of each of "n" first submatrices, and a matrix operation to generate values of the elements of each of "n" second submatrices, to each of "n" threads, where "n" is a positive integer. Thereby, the executer 303 can equalize the time required for matrix operations assigned to the respective threads, and can reduce the time required for all of the predetermined number of matrix operations.

The generator 304 obtains, from each of the threads, values of the elements of the corresponding one of the first submatrices, and values of the elements of the corresponding one of the second submatrices. Then, the generator 304 combines the obtained values of elements of the obtained first submatrices, and the obtained values of elements of the second submatrices, to generate values of the elements of the predetermined matrix. Thereby, the generator 304 can effectively complete execution of the matrix operation that generates values of the elements of the predetermined matrix.

The outputter 305 outputs the predetermined matrix generated by the generator 304. The output format is, for example, displaying on a display; printing out on a printer; transmitting to an external device through the network I/F 203; or storing in a storage area such as the memory 202 and the recording medium 205. The outputter 305 may output processed results of the respective functional units. Thereby, the outputter 305 enables the user of the information processing apparatus 100 to use the predetermined matrix or the processed results of the respective functional units generated by the generator 304. Also, the outputter 305 enables another program to use the predetermined matrix or the processed results of the respective functional units generated by the generator 304.

(Flow of Matrix Operation Using Multiple Threads on the Information Processing Apparatus 100)

Next, a flow of a matrix operation using multiple threads on the information processing apparatus 100 will be described by using FIG. 4 to FIG. 8.

Figure 4:
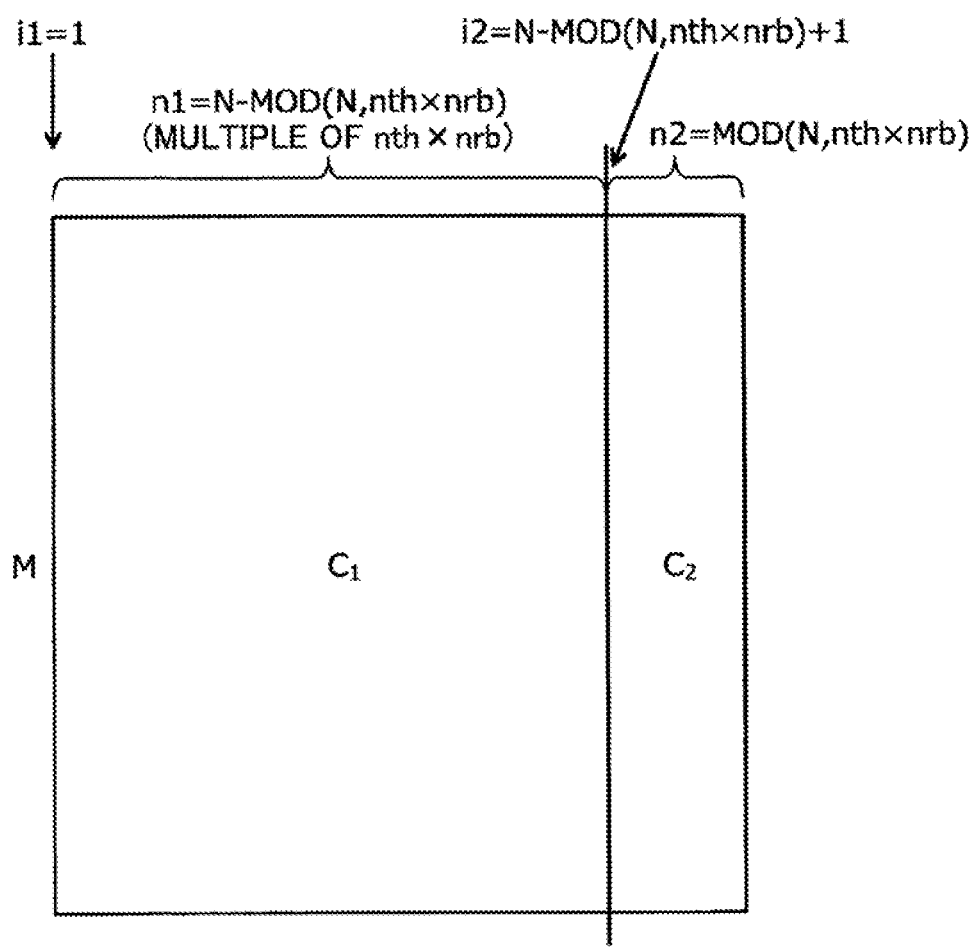
FIG. 4 is a first explanatory diagram illustrating a flow of a matrix operation that uses multiple threads on the information processing apparatus 100.

FIG. 4 to FIG. 8 are explanatory diagrams illustrating a flow of a matrix operation that uses multiple threads on the information processing apparatus 100. As illustrated in FIG. 4, the information processing apparatus 100 partitions a matrix C whose elements are generated by an inner product operation of a matrix A and a matrix B, into a submatrix $C_1$ and a submatrix $C_2$ Here, the submatrix $C_1$ is a submatrix whose position of the leading column in the row direction is represented by i1, and whose dimension in the row direction represented by n1, which is a multiple of (nth×nrb). Here, i1 is set to 1; nth represents the number of threads; nrb represents the block size; and n1 can be calculated by, for example, N-MOD(N, nth×nrb) where MOD(a, b) is a function to calculate the remainder of dividing a by b, and also represents the value of the remainder.

The submatrix $C_2$ is a submatrix whose position of the leading column in the row direction is represented by i2, and whose dimension in the row direction is represented by n2, which is the remainder obtained dividing N by (nth×nrb). Here, i2 is N-MOD(N, nth×nrb)+1; and n2 can be calculated by, for example, MOD(N, nth×nrb). Here, the description will shift to FIG. 5.

Figure 5:
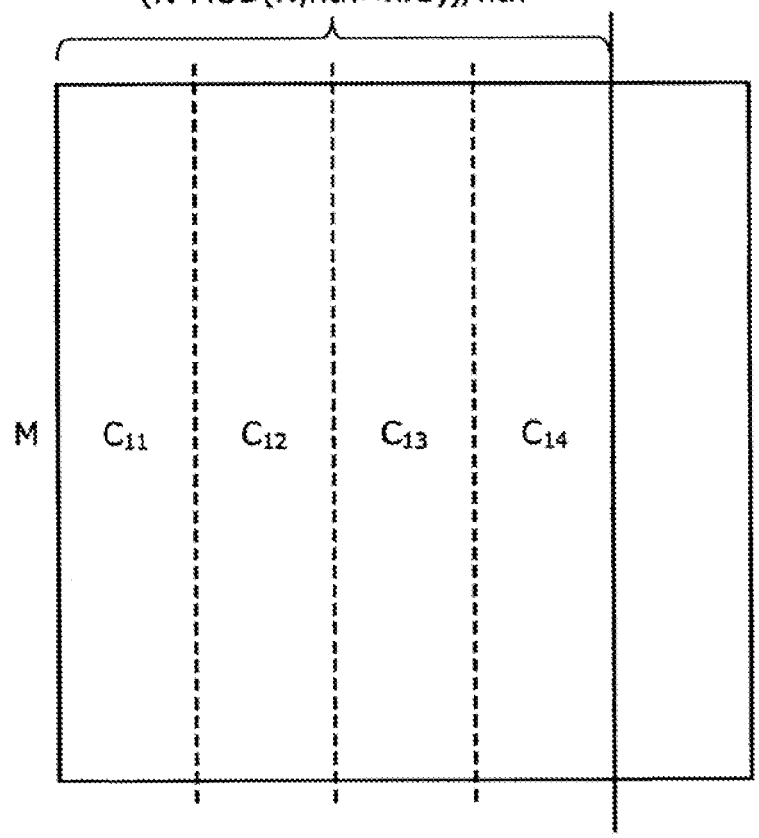
FIG. 5 is a second explanatory diagram illustrating a flow of a matrix operation that uses multiple threads on the information processing apparatus 100.

In FIG. 5, the information processing apparatus 100 partitions the submatrix $C_1$ in the row direction by nth that is the number of threads, to identify submatrices $C_{11}$, $C_{12}$, $C_{13}$, and $C_{14}$ whose dimension in the row direction is a multiple of the block size nrb. The dimension in the row direction of each of the submatrices $C_{11}$, $C_{12}$, $C_{13}$, and $C_{14}$ is (N-MOD(N, nth×nrb))/nth. The information processing apparatus 100 assigns a matrix operation to generate values of the elements of each of the submatrices $C_{11}$, $C_{12}$, $C_{13}$, and $C_{14}$, to each of the nth threads. Here, the description will shift to FIG. 6.

Figure 6:
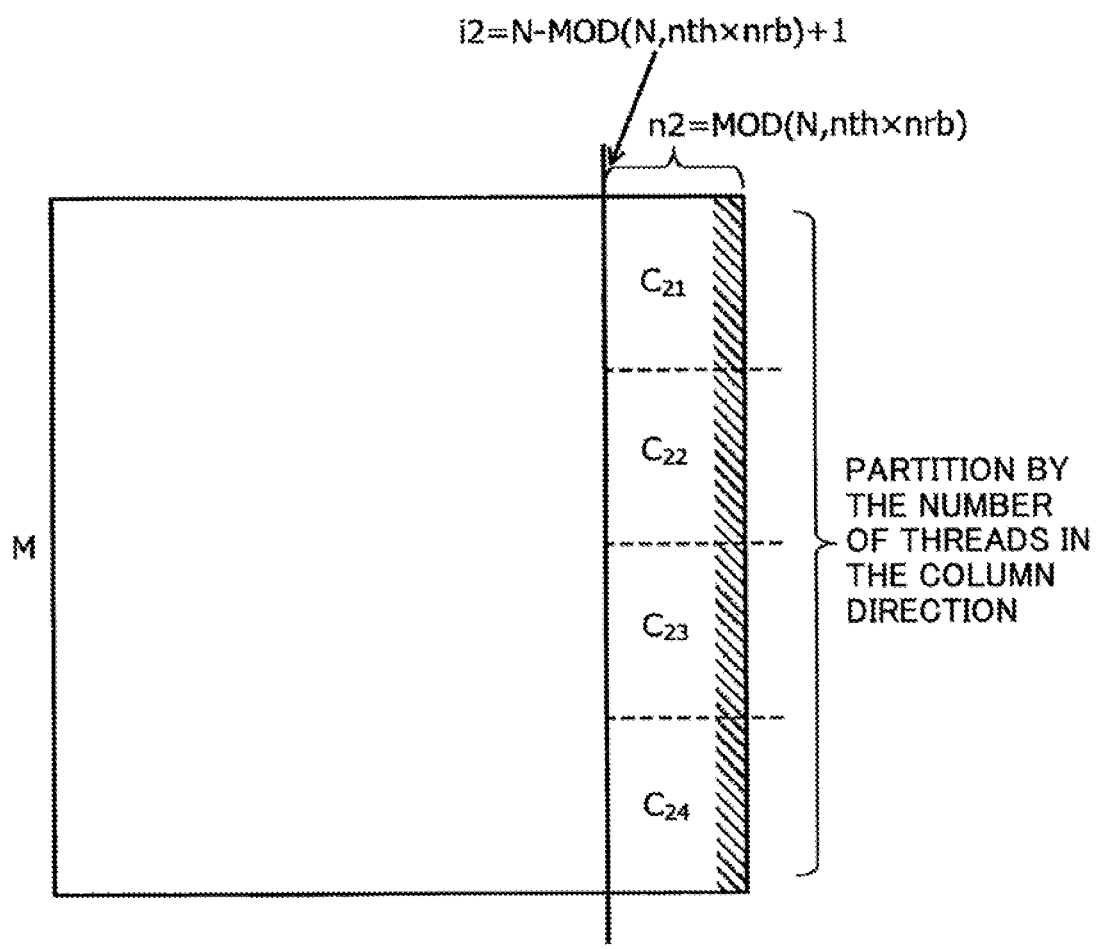
FIG. 6 is a third explanatory diagram illustrating a flow of a matrix operation that uses multiple threads on the information processing apparatus 100.

In FIG. 6, the information processing apparatus 100 partitions the submatrix $C_2$ in the column direction by the number of threads nth, to identify the submatrices $C_{21}$, $C_{22}$, $C_{23}$, and $C_{24}$ having substantially the same dimension in the column direction. The dimension in the row direction of the submatrices $C_{21}$, $C_{22}$, $C_{23}$, and $C_{24}$ is MOD(N, nth×nrb). The information processing apparatus 100 assigns a matrix operation to generate values of the elements of each of the submatrices $C_{21}$, $C_{22}$, $C_{23}$, and $C_{24}$, to each of the nth threads.

In the example in FIG. 6, the shaded area designates columns that correspond to the remainder as a result of uneven division in the row direction by the block size, and the efficiency of a matrix operation to generate values of the elements in the shaded area tends to be lower compared with matrix operations that generate the elements of the other areas. Taking this into account, the information processing apparatus 100 is configured to be capable of distributing matrix operations related to the shaded area among the nth threads, so as to equalize the processing load imposed on the threads. Here, the description will shift to FIG. 7.

Figure 7:
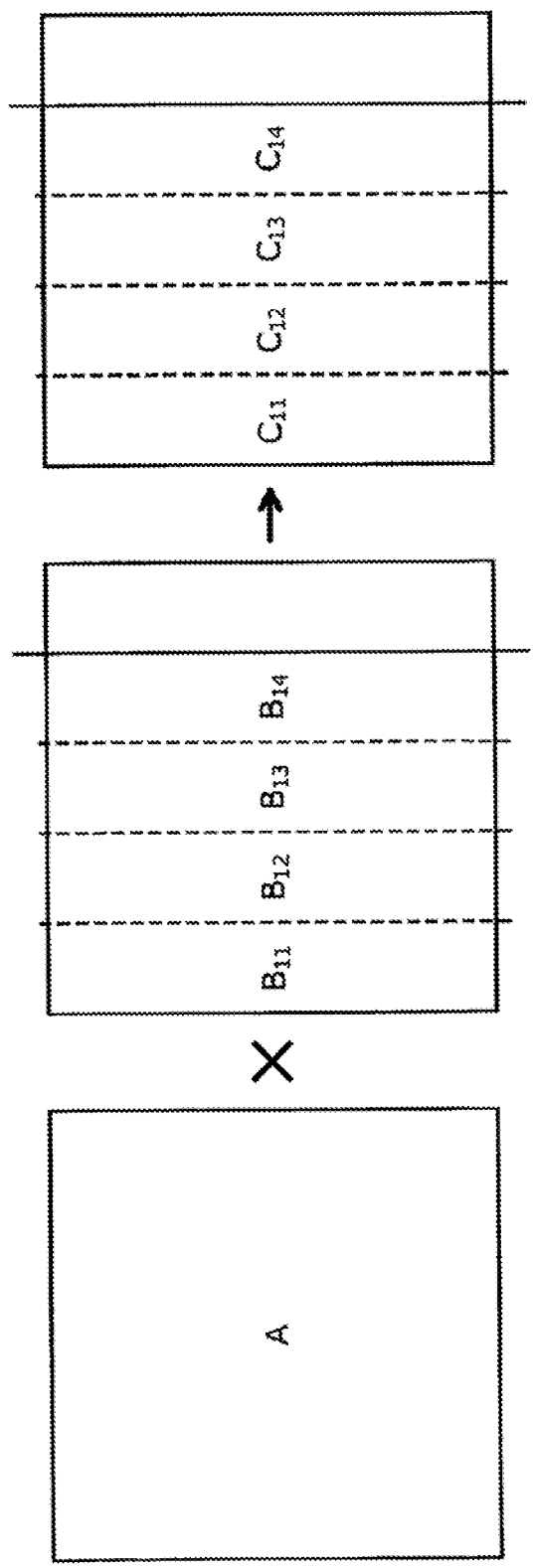
FIG. 7 is a fourth explanatory diagram illustrating a flow of a matrix operation that uses multiple threads on the information processing apparatus 100.

In FIG. 7, the information processing apparatus 100 causes each of the threads to execute the matrix operations assigned to the thread by using a cache blocking technique and a register blocking technique. Here, one thread is implemented, for example, in one core.

For example, in the case where the matrix operation that generates values of the elements of the submatrix $C_{11}$ is assigned to one of the threads, the thread identifies a submatrix $B_{11}$ that is obtained by partitioning the matrix B in the row direction, based on a relationship between the matrix C and the submatrix $C_{11}$. The submatrix $B_{11}$ has, for example, the leading column in the row direction at the same position as the submatrix $C_{11}$, and has the same dimension in the row direction as the submatrix $C_{11}$. Then, the thread executes an inner product operation of the matrix A and the submatrix $B_{11}$, to generate values of the elements of the submatrix $C_{11}$.

Similarly, in the case where the matrix operation that generates values of the elements of the submatrix $C_{12}$ is assigned to one of the threads, the thread executes an inner product operation of the matrix A and the submatrix $B_{12}$, to generate values of the elements of the submatrix $C_{12}$. Also, in the case where the matrix operation that generates values of the elements of the submatrix $C_{13}$ is assigned to one of the threads, the thread executes an inner product operation of the matrix A and the submatrix $B_{13}$, to generate values of the elements of the submatrix $C_{13}$.

Also, in the case where the matrix operation that generates values of the elements of the submatrix $C_{14}$ is assigned to one of the threads, the thread executes an inner product operation of the matrix A and the submatrix $B_{14}$, to generate values of the elements of the submatrix $C_{14}$. By running the nth threads in this way, the information processing apparatus 100 can generate values of the elements of the submatrix $C_1$ efficiently by the block size units. Here, the description will shift to FIG. 8.

Figure 8:
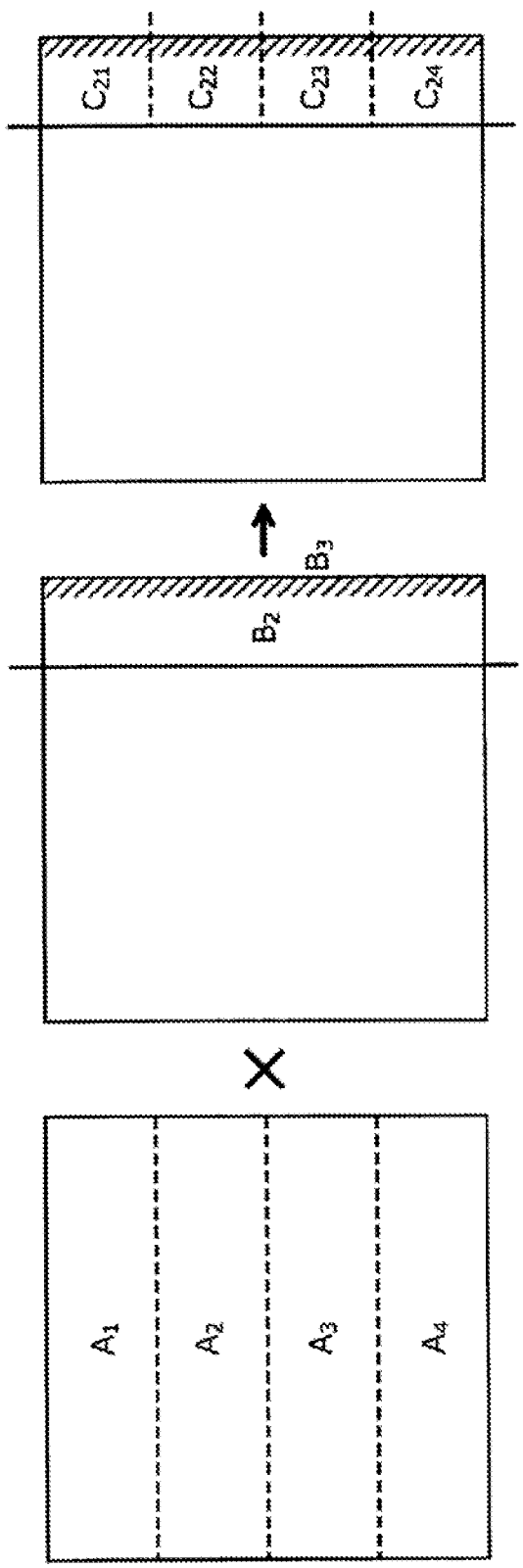
FIG. 8 is a fifth explanatory diagram illustrating a flow of a matrix operation that uses multiple threads on the information processing apparatus 100.

In FIG. 8, for example, in the case where the matrix operation that generates values of the elements of the submatrix $C_{21}$ is assigned to one of the threads, the threads identify a submatrix $A_1$ obtained by partitioning the matrix A in the column direction, based on a relationship between the matrix C and the submatrix $C_{21}$. The submatrix $A_1$ has, for example, the leading row in the column direction at the same position as the submatrix $C_{21}$, and has the same dimension in the column direction as the submatrix $C_{21}$.

Also, the thread identifies a submatrix $B_2$ obtained by partitioning the matrix B in the row direction, based on a relationship between the matrix C and the submatrix $C_{21}$. The submatrix $B_2$ has, for example, the leading column in the row direction at the same position as the submatrix $C_{21}$, and has the same dimension in the row direction as the submatrix $C_{21}$. The submatrix $B_2$ includes a submatrix $B_3$ that corresponds to columns as the remainder of uneven division in the row direction by the block size. Then, the thread executes an inner product operation of the matrix $A_1$ and the submatrix $B_2$, to generate values of the elements of the submatrix $C_{21}$.

Similarly, in the case where the matrix operation that generates values of the elements of the submatrix $C_{22}$ is assigned to one of the threads, the thread executes an inner product operation of the matrix $A_2$ and the submatrix $B_2$, to generate values of the elements of the submatrix $C_{22}$. Also, in the case where the matrix operation that generates values of the elements of the submatrix $C_{23}$ is assigned to one of the threads, the thread executes an inner product operation of the matrix $A_3$ and the submatrix $B_2$, to generate values of the elements of the submatrix $C_{23}$.

Also, in the case where the matrix operation that generates values of the elements of the submatrix $C_{24}$ is assigned to one of the threads, the thread executes an inner product operation of the matrix $A_4$ and the submatrix $B_2$, to generate values of the elements of the submatrix $C_{24}$. Thereby, the information processing apparatus 100 can equalize the time required for matrix operations assigned to the respective threads, and can reduce the time required for all of the matrix operations assigned to the nth threads.

For example, it is difficult to generate values of the elements efficiently in a matrix operation using the submatrix $B_3$, because partitioning evenly by the block size cannot be performed. Therefore, in the case where the matrix operation that uses the submatrix $B_3$ is assigned to a specific thread among the nth threads, the thread becomes a bottleneck and the time required for all matrix operations assigned to the nth threads increases. In contrast, the information processing apparatus 100 distributes the matrix operation that uses the submatrix $B_3$ to the nth threads, and hence, can equalize the load imposed on the threads.

(Application Example of Matrix Operation Using Multiple Threads on Information Processing Apparatus 100)

Next, an application example of a matrix operation using multiple threads on the information processing apparatus 100 will be described by using FIG. 9 to FIG. 11, in which specific values are set as the dimensions of a matrix A, a matrix B, and a matrix C.

Figure 9:
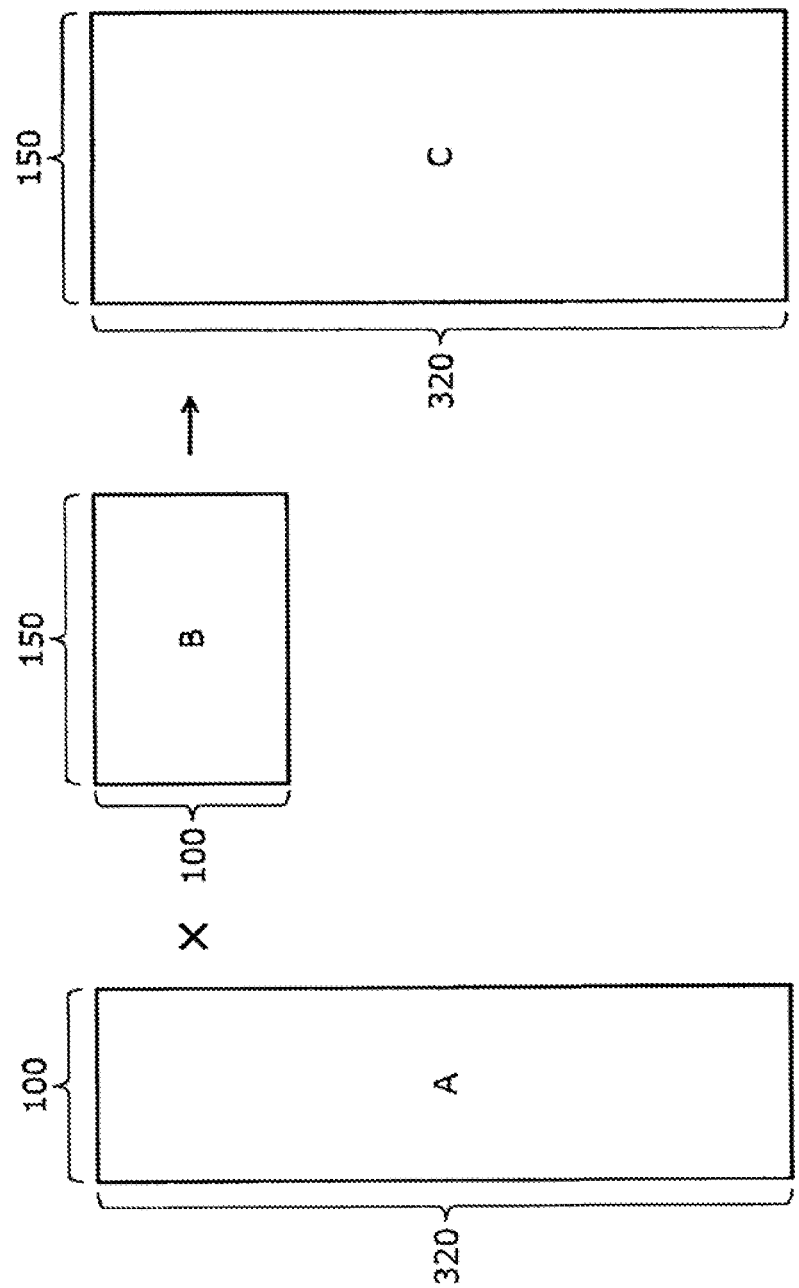
FIG. 9 is a first explanatory diagram illustrating an application example of a matrix operation that uses multiple threads on the information processing apparatus 100.
Figure 10:
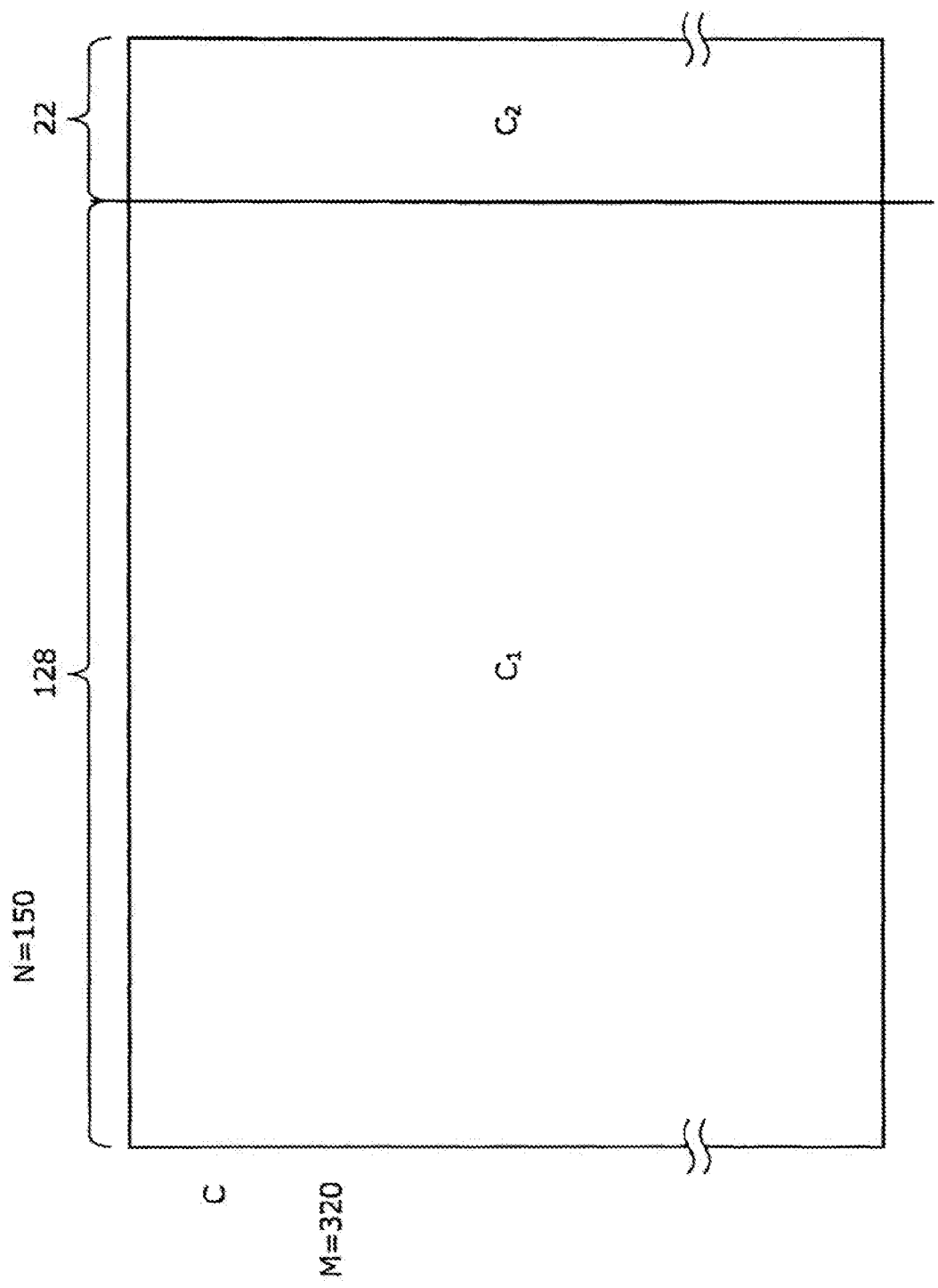
FIG. 10 is a second explanatory diagram illustrating an application example of a matrix operation that uses multiple threads on the information processing apparatus 100.
Figure 11:
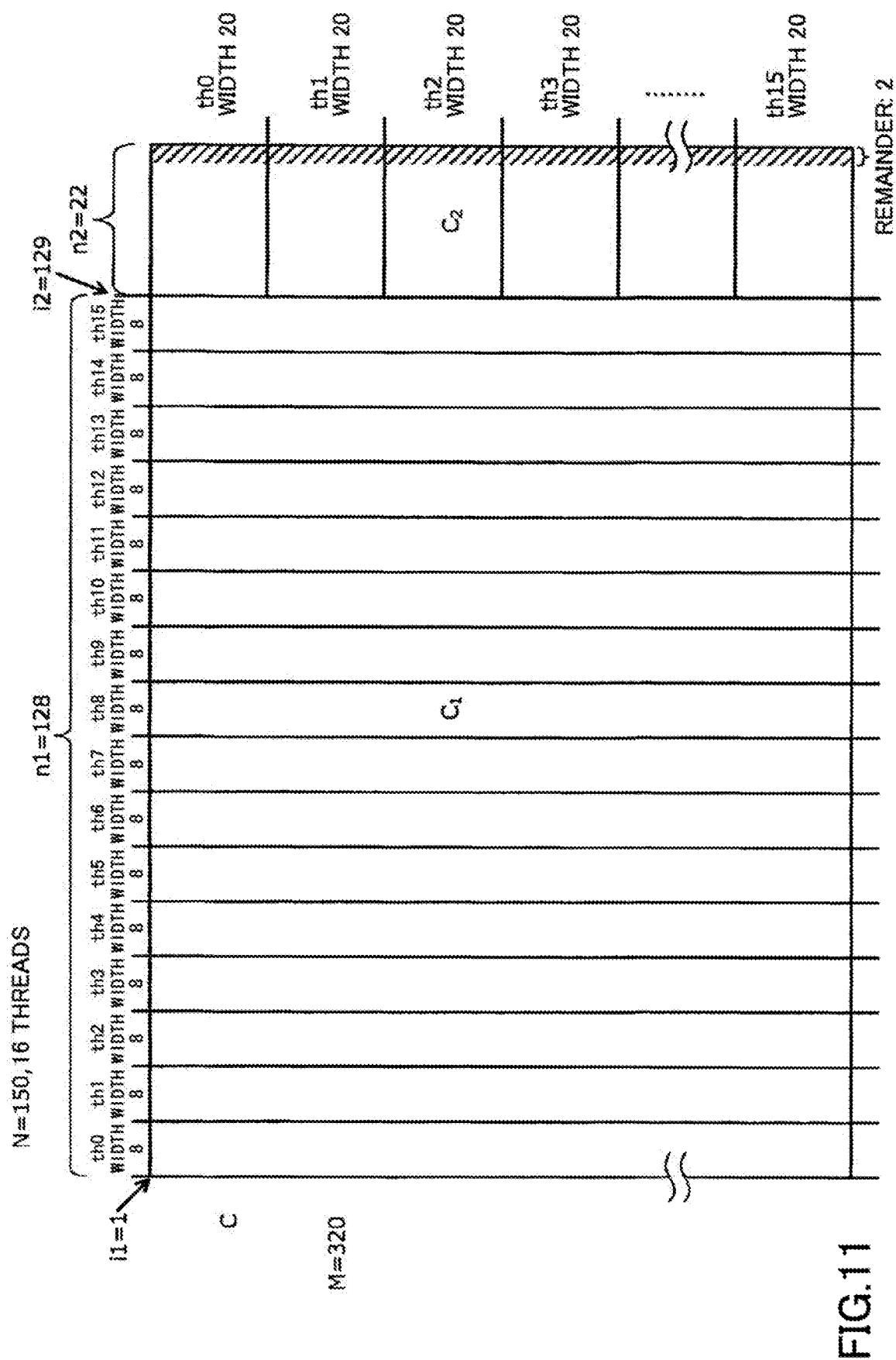
FIG. 11 is a third explanatory diagram illustrating an application example of a matrix operation that uses multiple threads on the information processing apparatus 100.

FIG. 9 to FIG. 11 are explanatory diagrams illustrating an application example of a matrix operation that uses multiple threads on the information processing apparatus 100. The information processing apparatus 100 generates nth threads in nth cores, respectively. Here, nth is assumed to be 16; ith represents the serial number of a thread, and takes an integer value in the range from 0 to nth−1.

In the following, a case will be described in which the information processing apparatus 100 executes an inner product operation of a matrix A of 320-by-100 and a matrix B of 100-by-150, to generate values of the elements of a matrix C of 320-by-150, by 16 generated threads. The block size nrb in the row direction is assumed to be 4. The block size mrb in the column direction is assumed to be 4. The threads execute operations as illustrated in FIG. 10 and FIG. 11. Here, the description will shift to FIG. 10.

In FIG. 10, a thread partitions the matrix C in the row direction, to identify a submatrix $C_1$ of 320-by-128 that can be divided evenly by the block size 4, and the submatrix $C_2$ of 320-by-22 that cannot be divided evenly by the block size 4.

The thread sets, for example, i1=1 as the sequence number of the leading column in the row direction of the submatrix $C_1$, and calculates n1=N−MOD(N, nth×nrb) as the dimension in the row direction of the submatrix $C_1$, to identify the submatrix $C_1$.

Also, the thread calculates i2=N−MOD(N, nth×nrb)+1 as the sequence number of the leading column in the row direction of the submatrix $C_2$, and calculates n2=MOD(N, nth×nrb) as the dimension in the row direction of the submatrix $C_2$, to identify the submatrix $C_2$.

Specifically, the thread sets, for example, i1=1 as the sequence number of the leading column in the row direction of the submatrix $C_1$. Also, the thread calculates n1=N−MOD (N, nth×nrb)=150−MOD(150, 16×4)=128 as the dimension in the row direction of the submatrix $C_1$, to identify the submatrix $C_1$.

Also, the thread calculates i2=N−MOD(N, nth×nrb)+1=150−MOD(150, 16×4)+1=129 as the sequence number of the leading column in the row direction of the submatrix $C_2$. Also, the thread calculates n2=MOD(N, nth×nrb)=MOD (150, 16×4)=22 as the dimension in the row direction of the submatrix $C_2$, to identify the submatrix $C_2$. Here, the description will shift to FIG. 11.

In FIG. 11, the thread partitions the submatrix $C_1$ in the row direction by 16 as the number of threads, to identify 16 submatrices whose dimension in the row direction is 8 as a multiple of the block size 4. The dimension in the row direction of each submatrix is (N−MOD(N, nth×nrb))/nth.

Next, the thread assigns a matrix operation to generate values of the elements of one of 16 submatrices. For example, for the submatrix assigned to the thread itself to which the matrix operation is to be applied to generate values of the elements, the thread calculates nn=n1/nth as the dimension in the row direction, and in=1+nn×ith as the sequence number of the leading column in the row direction.

Specifically, a thread th0 having the serial number 0 calculates, for the submatrix assigned to the thread itself to which the matrix operation is to be applied to generate values of the elements, nn=n1/nth=128/16=8 as the dimension in the row direction, and in=1+nn×ith=1+8×0=1 as the sequence number of the leading column in the row direction. In this way, the thread th0 having the serial number 0 identifies the submatrix assigned to the thread itself.

Then, the thread executes the matrix operation that generates values of the elements of the submatrix assigned to the thread itself. The thread executes the matrix operation, for example, by A(1:M, 1:K)×B(1:K, in:inch+nn−1)→C(1:M, in:inch+nn−1).

Here, A(a:b, c:d) represents values of elements at rows a to b and columns c to d of the matrix A. B(a:b, c:d) represents values of elements at rows a to b and columns c to d of the matrix A. C(a:b, c:d) represents values of elements at rows a to b and columns c to d of the matrix A. Also, "→" represents setting the result of the inner product operation using values of the elements of the matrix A and the matrix B, as values of the elements of the matrix C.

The thread partitions the submatrix $C_2$ in the column direction by 16 as the number of threads, to identify 16 submatrices whose dimension in the column direction is 20. In the case where the dimension in the column direction of the submatrix $C_2$ cannot be divided evenly by 16 as the number of threads, the thread distributes rows corresponding to the remainder to the submatrices, or to the submatrix at the end.

Next, the thread assigns a matrix operation to generate values of the elements of one of the 16 submatrices. For the submatrix assigned to the thread itself to which the matrix operation is to be applied to generate values of the elements, the thread calculates im=1+mw×ith+MIN(MOD(M, nth), ith) as the sequence number of the leading column in the row direction. Here, mw=M/nth. MIN(a, b) represents the smaller one among a and b. Also, for the submatrix assigned to the thread itself to which the matrix operation is to be applied to generate values of the elements, the thread calculates mm=1+mw×(ith+1)+MIN(MOD(M, nth), ith+1)−im as the dimension in the column direction.

Specifically, the thread th0 having the serial number 0 calculates mw=M/nth=20. The thread th0 having the serial number 0 calculates im=1+mw×ith+MIN(MOD(M, nth), ith)=1 as the sequence number of the leading column in the row direction in the submatrix assigned to the thread itself to which the matrix operation is to be applied to generate values of the elements. The thread th0 having the serial number 0 calculates mm=1+nw×(ith+1)+MIN(MOD(M, nth), ith+1)−im=20 as the dimension in the column direction of the submatrix assigned to the thread itself to which the matrix operation is to be applied to generate values of the elements. In this way, the thread th0 having the serial number 0 identifies the submatrix assigned to the thread itself.

Then, the thread executes the matrix operation that generates values of the elements of the submatrix assigned to the thread itself. The thread executes the matrix operation, for example, by A(im:im+mm−1, 1:K)×B(1:K, i2:i2+n2−1)→C (im:im+mm−1, i2:i2+n2−1). Upon completion of the matrix operations by the 16 threads, the information processing apparatus 100 terminates the 16 threads. In this way, the information processing apparatus 100 can generate values of the elements of the matrix C.

Here, as having been practiced conventionally, one may consider partitioning the matrix C into 16 submatrices having nearly the same dimension in the row direction, to be assigned to 16 threads. For example, in the case of partitioning a matrix C of 320-by-150, matrix operations for submatrices of 320-by-10 may be assigned to threads th0 to th5, and matrix operations for submatrices of 320-by-9 may be assigned to threads th6 to th15. In this case, both the matrix operations for submatrices of 320-by-10 and the matrix operations for submatrices of 320-by-9 have low operational efficiency, because these cannot be divided evenly by the block size 4. For example, the operational efficiency of both the matrix operations for submatrices of 320-by-10 and the matrix operations for submatrices of 320-by-9 turn out to be virtually the same operational efficiency as matrix operations for submatrices of 320-by-12 that can be divided evenly by the block size 4.

Consequently, the execution time by the threads would be virtually the same as the time required for executing matrix operations for submatrices of 320-by-12. Specifically, the computation time per thread would be equal to the time to execute sum-of-product operations for 320×(ceiling(10/nrb)×nrb)×100=432000 times. Here, "ceiling" means rounding up decimals of a value.

In contrast, the information processing apparatus 100 partitions a matrix C into submatrices $C_1$ that can be divided evenly by the block size in the row direction, and submatrices $C_2$ that include a part corresponding to the remainder that cannot be divided evenly by the block size in the row direction. This enables the information processing apparatus 100 to efficiently execute matrix operations related to the submatrices $C_1$ that can be divided evenly by the block size in the row direction.

In addition, the information processing apparatus 100 distributes the submatrices $C_2$ to 16 threads so as to cause the threads to execute matrix operations related to submatrices of 20-by-22. This enables the information processing apparatus 100 to efficiently execute matrix operations related to submatrices of 20-by-20 in the respective submatrices of 20-by-22. Also, the information processing apparatus 100 causes the threads to execute matrix operations related to submatrices of 20-by-2, and hence, can equalize the load imposed on the threads.

In this way, the information processing apparatus 100 can reduce the time required for all of the matrix operations executed by the 16 threads. Specifically, the computation time per thread is equivalent to the time required for executing sum-of-product operations for 320×(ceiling(8/nrb)×nrb)×100+20×(ceiling(22/nrb)×nrb)×100=336000 times.

Therefore, the information processing apparatus 100 can reduce the time required for all of the matrix operations executed by the 16 threads by approximately 20% compared with conventional cases. Also, the information processing apparatus 100 can generally reduce the time required for numerical computation in the case where matrix operations are included in the numerical computation.

Here, the information processing apparatus 100 has been described in the case where a submatrix whose dimension in the row direction is a multiple of the block size is used as the first submatrix. This enables the information processing apparatus 100 to reduce the time required for all matrix operations executed by multiple threads in the case where there is a tendency in the shape of the predetermined matrix such that the dimension in the row direction cannot be divided evenly by the block size.

Meanwhile, the information processing apparatus 100 may use a submatrix whose dimension in the column direction is a multiple of the block size as the first submatrix. This enables the information processing apparatus 100 to reduce the time required for all matrix operations executed by multiple threads in the case where there is a tendency in the shape of the predetermined matrix such that the dimension in the column direction cannot be divided evenly by the block size.

Here, there may a case where the predetermined matrix has a shape such that the dimension in the row direction cannot be divided evenly by the block size, and the dimension in the column direction cannot be divided evenly by the block size. In this case, when manipulating the matrices by the units of the block size, a smaller remainder of the division by the block size tends to introduce a greater increase of the time required for matrix operations.

Specifically, in the case where only one column corresponds to the remainder of the division by the block size in the row direction, the time required for manipulating the one column corresponding to the remainder tends to reach the same time as required for manipulating the block-size numbers of columns, for example, four columns. Meanwhile, in the case where three rows correspond to the remainder of the division by the block size in the column direction, the time required for manipulating the three rows corresponding to the remainder tends to reach virtually the same time as required for manipulating the block-size numbers of rows, for example, four rows.

With respect to such specific examples, there is likelihood that the information processing apparatus 100 can reduce the time required for all matrix operations executed by multiple threads, by using a submatrix whose dimension in the row direction is a multiple of the block size, as the first submatrix.

Thereupon, the information processing apparatus 100 may selectively use, as the first submatrix, a submatrix whose dimension in the row direction is a multiple of the block size, or a submatrix whose dimension in the column direction is a multiple of the block size, depending on the shape of the predetermined matrix. This enables the information processing apparatus 100 to selectively use the partitioning methods of partitioning the predetermined matrix so as to reduce efficiently the time required for all matrix operations assigned to a predetermined number of threads.

Here, although the case has been described where multiple threads identify a matrix operation to be executed by the thread itself, and executes the identified matrix operation, it is not limited as such. For example, the information processing apparatus 100 may manage matrix operations assigned to the threads, and causes the threads to execute the matrix operations.

(Example of Processing Steps of Matrix Operation)

Next, an example of processing steps of a matrix operation will be described by using FIG. 12.

Figure 12:
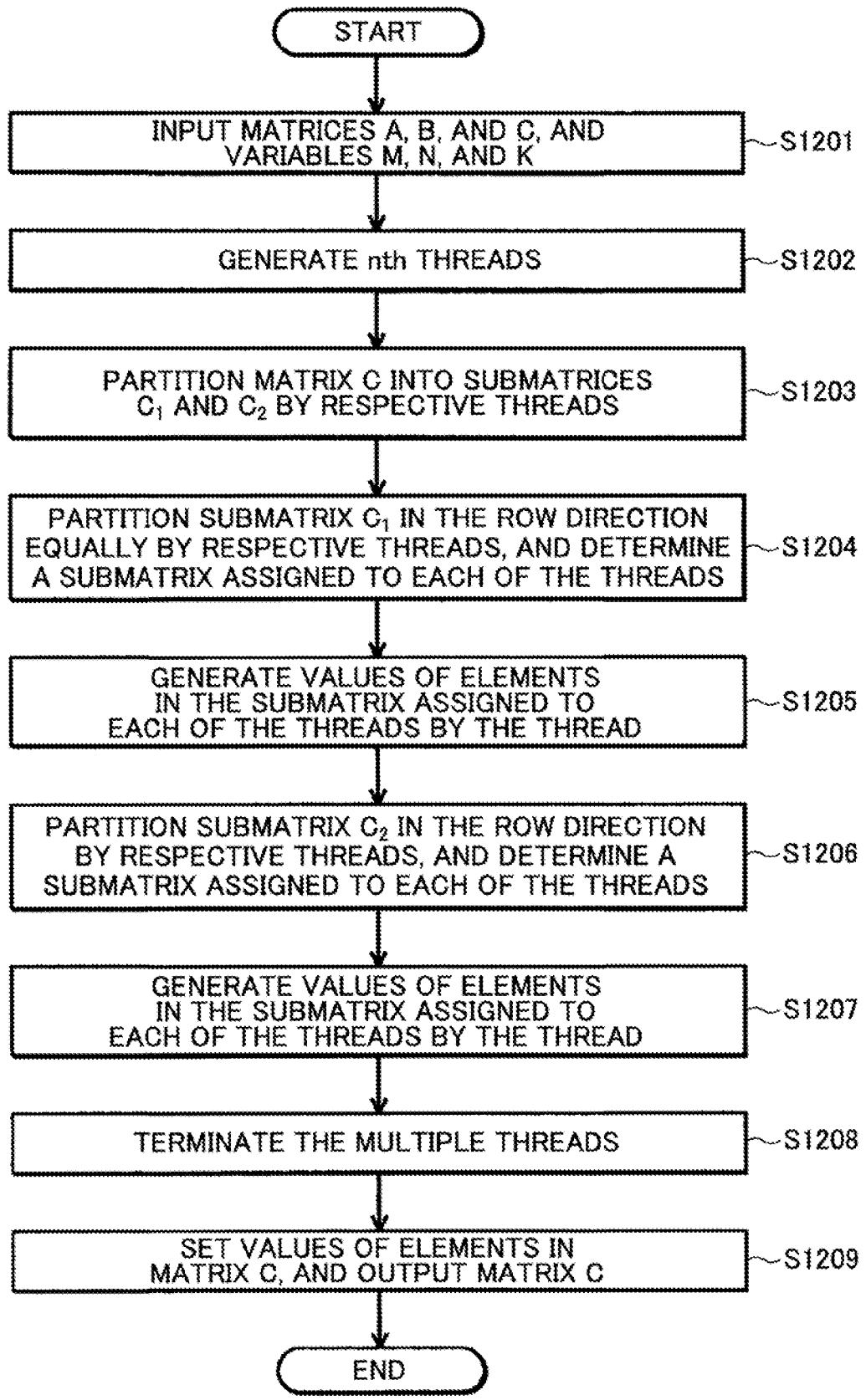
FIG. 12 is a flowchart illustrating an example of steps of a matrix operation.

FIG. 12 is a flowchart illustrating an example of processing steps of a matrix operation. In FIG. 12, the information processing apparatus 100 receives, as input, a matrix A used for matrix operations, a matrix B used for matrix operations, and a matrix C whose values of the elements are to be generated by matrix operations, along with variables M, N, and K that specify the dimensions of the matrix A, B, and C (Step S1201). For example, values of the elements of the matrix C are initialized, and will be updated by the matrix operation.

Next, the information processing apparatus 100 generates nth threads to which matrix operations are assigned (Step S1202). The serial number ith is assigned to each of the nth threads. Here, ith is, for example, an integer ranging from 0 to nth−1.

Then, the information processing apparatus 100 causes the threads to partition the matrix C into a submatrix $C_1$ that has the leading column at the position i1 and the dimension in the row direction being n1, and a submatrix $C_2$ that has the leading column at the position i2 and the dimension in the row direction being n2 (Step S1203). Here, i1 is, for example, 1; n1 is, for example, N−MOD(N, nth×nrb); i2 is, for example, N−MOD(N, nth×nrb)+1; and n2 is, for example, MOD(N, nth×nrb).

Next, the information processing apparatus 100 partitions the submatrix $C_1$ evenly by the threads, and determines a submatrix that has the leading column at the position in and the dimension in the row direction being nn, as the submatrix to be processed by each of the threads (Step S1204). Among the submatrices obtained by evenly partitioning the submatrix $C_1$, a thread having the serial number ith determines a submatrix that has the leading column at the position ith+1 counting from the head in the row direction, as the submatrix to be processed by the thread itself.

Then, the information processing apparatus 100 causes each of the threads to apply a cache blocking technique and a register blocking technique to a matrix operation to generate values of the elements of the submatrix to be processed by the thread itself (Step S1205). Values of the elements of the submatrix C(1:M, in:inch+nn−1) processed by the thread itself are, for example, A(1:M, 1:K)×B(1:K, in:inch+nn−1) where A(1:M, 1:K) are values of the elements of the matrix A and B(1:K, in:inch+nn−1) are values of the elements of the matrix B.

Next, the information processing apparatus 100 partitions the submatrix $C_2$ by the threads, and determines a submatrix that has the leading row at the position im and the dimension in the column direction being mm, as the submatrix to be processed by each of the threads (Step S1206). Among the submatrices obtained by partitioning the submatrix $C_2$, the thread having the serial number ith determines a submatrix that has the leading row at the position ith+1 counting from the head in the column direction, as the submatrix to be processed by the thread itself.

Then, the information processing apparatus 100 causes each of the threads to apply a cache blocking technique and a register blocking technique to a matrix operation to generate values of the elements of the submatrix to be processed by the thread itself (Step S1207). Values of the elements of the submatrix C(im:im+mm−1, 2:i2+n2−1) processed by the thread itself are, for example, A(im:im+mm−1, 1:K)×B(1:K, i2:i2+n2−1) where A(im:im+mm−1, 1:K) are values of the elements of the matrix A and B(1:K, i2:i2+n2−1) are values of the elements of the matrix B.

Next, after having obtained operation results of the matrix operations from the multiple threads, the information processing apparatus 100 terminates the multiple threads (Step S1208). Then, based on the obtained operation results, the information processing apparatus 100 sets values of the elements of the matrix C, and outputs the matrix C (Step S1209). In this way, the information processing apparatus 100 can generate values of the elements of the matrix C efficiently.

As described above, the information processing apparatus 100 is capable of partitioning a predetermined matrix into a predetermined number of first submatrices whose dimension in at least one of the row direction and the column direction is a multiple of the block size, and the predetermined number of second submatrices. The information processing apparatus 100 is capable of assigning a matrix operation to generate values of the elements of each of the predetermined number of first submatrices, and a matrix operation to generate values of the elements of each of the predetermined number of second submatrices, to each of the predetermined number of threads. This enables the information processing apparatus 100 to equalize the time required for the matrix operations assigned to the respective threads, so as to reduce the time required for all of the predetermined number of matrix operations.

The information processing apparatus 100 is capable of partitioning the predetermined matrix into the predetermined number of first submatrices whose dimension in the row direction is a multiple of the block size, and the predetermined number of second submatrices. This enables the information processing apparatus 100 is capable of efficiently reducing the time required for all matrix operations assigned to the predetermined number of threads, in the case where the dimension in the row direction of the predetermined matrix cannot be divided evenly by the block size.

The information processing apparatus 100 is capable of partitioning a predetermined matrix into the predetermined number of first submatrices whose dimension in the column direction is a multiple of the block size, and the predetermined number of second submatrices. This enables the information processing apparatus 100 to efficiently reduce the time required for all matrix operations assigned to the predetermined number of threads, in the case where the dimension in the column direction of the predetermined matrix cannot be divided evenly by the block size.

The information processing apparatus 100 is capable of comparing a first remainder obtained by dividing the dimension in the row direction of a predetermined matrix by the block size, with a second remainder obtained by dividing the dimension in the column direction of the predetermined matrix by the block size. As a result of the comparison, if the first remainder is less than the second remainder, the information processing apparatus 100 is capable of partitioning the predetermined matrix into the predetermined number of first submatrices whose dimension in the row direction is a multiple of the block size, and the predetermined number of second submatrices. As a result of the comparison, if the first remainder is greater than the second remainder, the information processing apparatus 100 is capable of partitioning the predetermined matrix into the predetermined number of first submatrices whose dimension in the column direction is a multiple of the block size, and the predetermined number of second submatrices. This enables the information processing apparatus 100 to selectively use the partitioning methods of partitioning the predetermined matrix, and to efficiently reduce the time required for all matrix operations assigned to the predetermined number of threads.

The information processing apparatus 100 is capable of obtaining values of the elements of first submatrices, and values of the elements of second submatrices from the threads. The information processing apparatus 100 is capable of generating values of the elements of the predetermined matrix, by combining the obtained values of the elements of the first submatrices, and the obtained values of the elements of the second submatrices. This enables the information processing apparatus 100 to output values of the elements of the predetermined matrix, so as to make the predetermined matrix usable.

Note that the multithread matrix operation method described in the embodiments can be implemented by running a program prepared in advance on a computer such as a personal computer or a workstation. The multithread matrix operation program described in the embodiments may be recorded on a computer-readable recording medium including a hard disk, a flexible disk, a CD-ROM, an MO, and a DVD, and the program is read from the recording medium, and executed by the computer. Also, the multithread matrix operation program described in the embodiments may be distributed through a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
a memory; and
a processor configured to execute partitioning a primary submatrix of a predetermined matrix whose values of elements are to be generated by a matrix operation, into a number of first submatrices whose dimension in one of a row direction and a column direction is a multiple of a block size corresponding to a number of registers of the processor used to perform the matrix operation, and partitioning a secondary submatrix of the predetermined matrix from which the primary submatrix is removed into a same number of second submatrices that are different from the first submatrices;
assigning first matrix operations, each provided to generate values of elements of a corresponding one of the first submatrices, to a same number of threads, respectively, and assigning second matrix operations, each provided to generate values of elements of a corresponding one of the second submatrices, to the number of threads, respectively;
executing the first matrix operations to generate the values of the elements of each of the first submatrices in the case where the first matrix operations are assigned to the threads, and executing the second matrix operations to generate the values of the elements of each of the second submatrices in the case where the second matrix operations are assigned to the threads;
obtaining from the threads the values of the elements of each of the first submatrices in a case where the first matrix operations are assigned to the threads, and obtaining from the threads the values of the elements of each of the second submatrices in a case where the second matrix operations are assigned to the threads;
combining the obtained values of the elements of each of the first submatrices and the obtained values of the elements of each of the second submatrices to generate the values of the elements of the predetermined matrix; and
outputting the generated values of the elements of the predetermined matrix to an external device.

2. The information processing apparatus as claimed in claim 1, wherein the partitioning partitions the predetermined matrix into the number of the first submatrices whose dimension in the row direction is a multiple of the block size, and into the same number of the second submatrices.

3. The information processing apparatus as claimed in claim 1, wherein the partitioning partitions the predetermined matrix into the number of the first submatrices whose dimension in the column direction is a multiple of the block size, and into the same number of the second submatrices.

4. The information processing apparatus as claimed in claim 1, wherein the partitioning compares a first remainder obtained by dividing the dimension in the row direction of the predetermined matrix by the block size, with a second remainder obtained by dividing the dimension in the column direction of the predetermined matrix by the block size,
as a result of the comparison, in a case where the first remainder is smaller than the second remainder, partitions the predetermined matrix into the number of the first submatrices whose dimension in the row direction is a multiple of the block size, and into the same number of the second submatrices, and
as a result of the comparison, in a case where the first remainder is greater than the second remainder, partitions the predetermined matrix into the number of the first submatrices whose dimension in the column direction is a multiple of the block size, and into the same number of the second submatrices.

5. The information processing apparatus as claimed in claim 1, wherein the predetermined number of the threads are implemented by the predetermined number of arithmetic logic units, respectively.

6. A multithread matrix operation method executed by a computer, the method comprising:
partitioning a primary submatrix of a predetermined matrix whose values of elements are to be generated by a matrix operation, into a number of first submatrices whose dimension in one of a row direction and a column direction is a multiple of a block size corresponding to a number of registers of a processor used to perform the matrix operation, and partitioning a secondary submatrix of the predetermined matrix from which the primary submatrix is removed into a same number of second submatrices that are different from the first submatrices;
assigning first matrix operations, each provided to generate values of elements of a corresponding one of the first submatrices, to a same number of threads, respectively, and assigning second matrix operations, each provided to generate values of elements of a corresponding one of the second submatrices, to the number of threads, respectively;
executing the first matrix operations to generate the values of the elements of each of the first submatrices in the case where the first matrix operations are assigned to the threads, and executing the second matrix operations to generate the values of the elements of each of the second submatrices in the case where the second matrix operations are assigned to the threads;
obtaining from the threads the values of the elements of each of the first submatrices in a case where the first matrix operations are assigned to the threads, and obtaining from the threads the values of the elements of each of the second submatrices in a case where the second matrix operations are assigned to the threads;
combining the obtained values of the elements of each of the first submatrices and the obtained values of the elements of each of the second submatrices to generate the values of the elements of the predetermined matrix; and
outputting the generated values of the elements of the predetermined matrix to an external device.

7. A non-transitory computer-readable recording medium having a program stored therein for causing a computer to execute a process of multithread matrix operations executed by a computer, the process comprising:
partitioning a primary submatrix of a predetermined matrix whose values of elements are to be generated by a matrix operation, into a number of first submatrices whose dimension in one of a row direction and a column direction is a multiple of a block size corresponding to a number of registers of a processor used to perform the matrix operation, and partitioning a secondary submatrix of the predetermined matrix from which the primary submatrix is removed into a same number of second submatrices that are different from the first submatrices;

assigning first matrix operations, each provided to generate values of elements of a corresponding one of the first submatrices, to a same number of threads, respectively, and assigning second matrix operations, each provided to generate values of elements of a corresponding one of the second submatrices, to the number of threads, respectively;

executing the first matrix operations to generate the values of the elements of each of the first submatrices in the case where the first matrix operations are assigned to the threads, and executing the second matrix operations to generate the values of the elements of each of the second submatrices in the case where the second matrix operations are assigned to the threads;

obtaining from the threads the values of the elements of each of the first submatrices in a case where the first matrix operations are assigned to the threads, and obtaining from the threads the values of the elements of each of the second submatrices in a case where the second matrix operations are assigned to the threads;

combining the obtained values of the elements of each of the first submatrices and the obtained values of the elements of each of the second submatrices to generate the values of the elements of the predetermined matrix; and outputting the generated values of the elements of the predetermined matrix to an external device.

* * * * *